(12) United States Patent
Chang

(10) Patent No.: US 10,816,816 B2
(45) Date of Patent: Oct. 27, 2020

(54) TUNABLE FILM APPARATUS

(71) Applicant: GM GLOBAL TECHNOLOGY OPERATIONS LLC, Detroit, MI (US)

(72) Inventor: Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 16/120,641

(22) Filed: Sep. 4, 2018

(65) Prior Publication Data

US 2020/0073139 A1  Mar. 5, 2020

(51) Int. Cl.
| | | |
|---|---|---|
| *G02B 27/48* | (2006.01) | |
| *G02F 1/137* | (2006.01) | |
| *G02F 1/1335* | (2006.01) | |
| *G02F 1/1347* | (2006.01) | |
| *G02F 1/133* | (2006.01) | |
| *G02F 1/1337* | (2006.01) | |
| *G02F 1/1343* | (2006.01) | |
| *G02F 1/1334* | (2006.01) | |

(52) U.S. Cl.
CPC ............ *G02B 27/48* (2013.01); *G02F 1/137* (2013.01); *G02F 1/1347* (2013.01); *G02F 1/13306* (2013.01); *G02F 1/133504* (2013.01); *G02F 1/133528* (2013.01); *G02F 1/1334* (2013.01); *G02F 1/13439* (2013.01); *G02F 1/133723* (2013.01); *G02F 2001/13775* (2013.01); *G02F 2001/133548* (2013.01); *G02F 2203/01* (2013.01); *G02F 2203/02* (2013.01); *G02F 2203/09* (2013.01)

(58) Field of Classification Search
CPC ........... G02F 1/13306; G02F 1/133504; G02F 1/133528; G02F 1/137; G02F 1/1347; G02F 2203/01; G02F 2001/13775; G02F 1/1334; G02F 1/133723; G02F 2203/02; G02F 2001/133548; G02F 1/13439; G02F 2203/09; G02B 27/48
See application file for complete search history.

(56) References Cited

U.S. PATENT DOCUMENTS

| | | | | |
|---|---|---|---|---|
| 4,444,469 A | * | 4/1984 | Kaye | G02F 1/1393 349/18 |
| 5,119,216 A | * | 6/1992 | Wada | G02F 1/133636 349/76 |
| 5,726,723 A | * | 3/1998 | Wang | G02F 1/1396 349/181 |
| 9,304,333 B2 | * | 4/2016 | Taheri | G02B 5/3025 |
| 2004/0061939 A1 | * | 4/2004 | Bievenour | G02B 5/24 359/491.01 |
| 2004/0223103 A1 | * | 11/2004 | Elman | C08G 63/193 349/117 |

(Continued)

FOREIGN PATENT DOCUMENTS

| | | | | |
|---|---|---|---|---|
| GB | 2266599 A | * | 11/1993 | ......... G02F 1/13363 |
| JP | 03240024 A | * | 10/1991 | |

*Primary Examiner* — Hoan C Nguyen
(74) *Attorney, Agent, or Firm* — Lorenz & Kopf, LLP

(57) ABSTRACT

A tunable film apparatus is provided. The apparatus includes: a first and second layer, a linear polarizer disposed in front of the first layer, liquid crystal elements disposed between the first and second layer; and a tuner configured to cause temporal averaging of a light received through the linear polarizer.

6 Claims, 5 Drawing Sheets

(56) References Cited

U.S. PATENT DOCUMENTS

| | | | |
|---|---|---|---|
| 2008/0062353 A1* | 3/2008 | Wang | G02F 1/133382 |
| | | | 349/72 |
| 2008/0084522 A1* | 4/2008 | Lee | G02F 1/1334 |
| | | | 349/88 |
| 2013/0033588 A1* | 2/2013 | Shiomi | H04N 13/398 |
| | | | 348/58 |
| 2018/0335630 A1* | 11/2018 | Lu | G02F 1/13471 |
| 2020/0073138 A1* | 3/2020 | Chang | G02F 1/1334 |

* cited by examiner

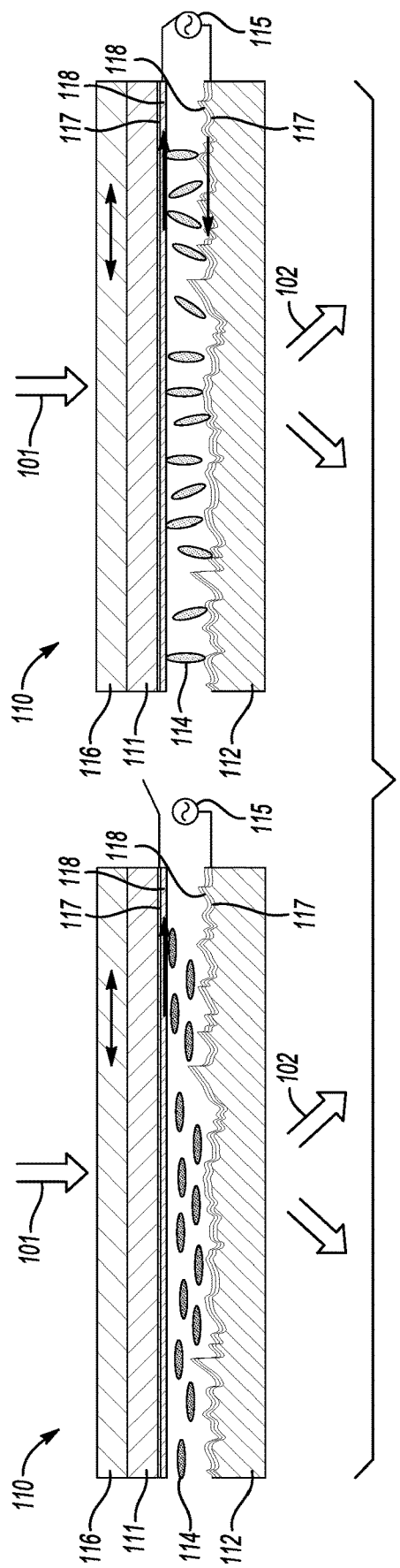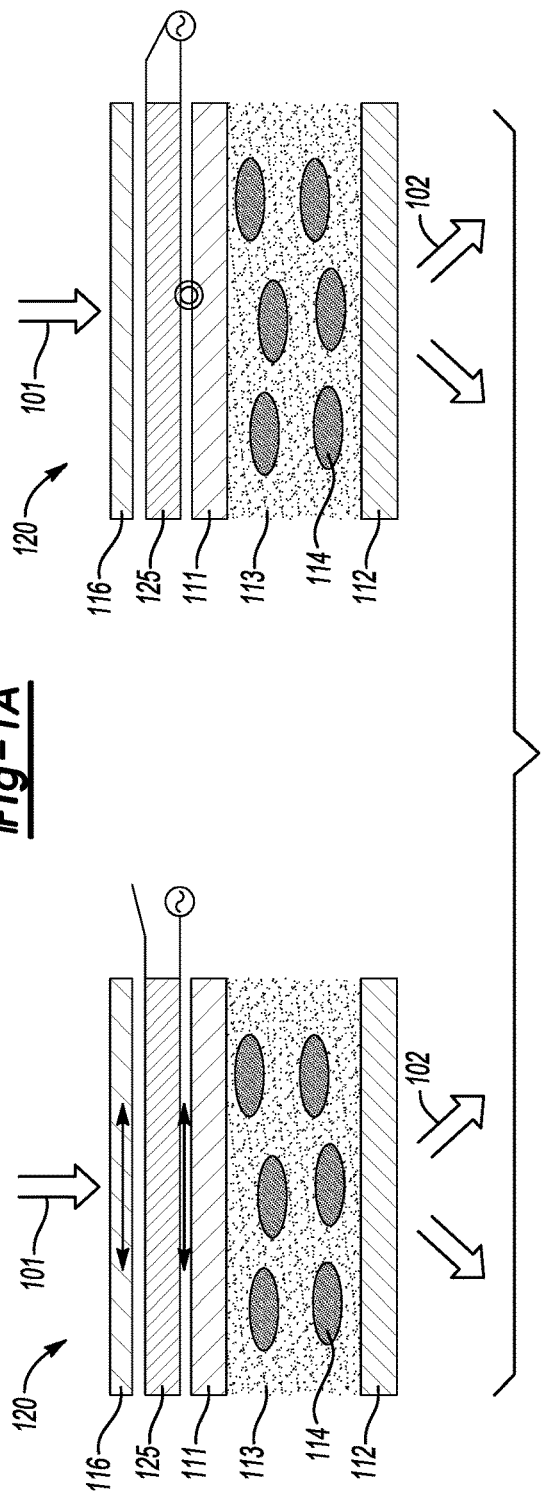

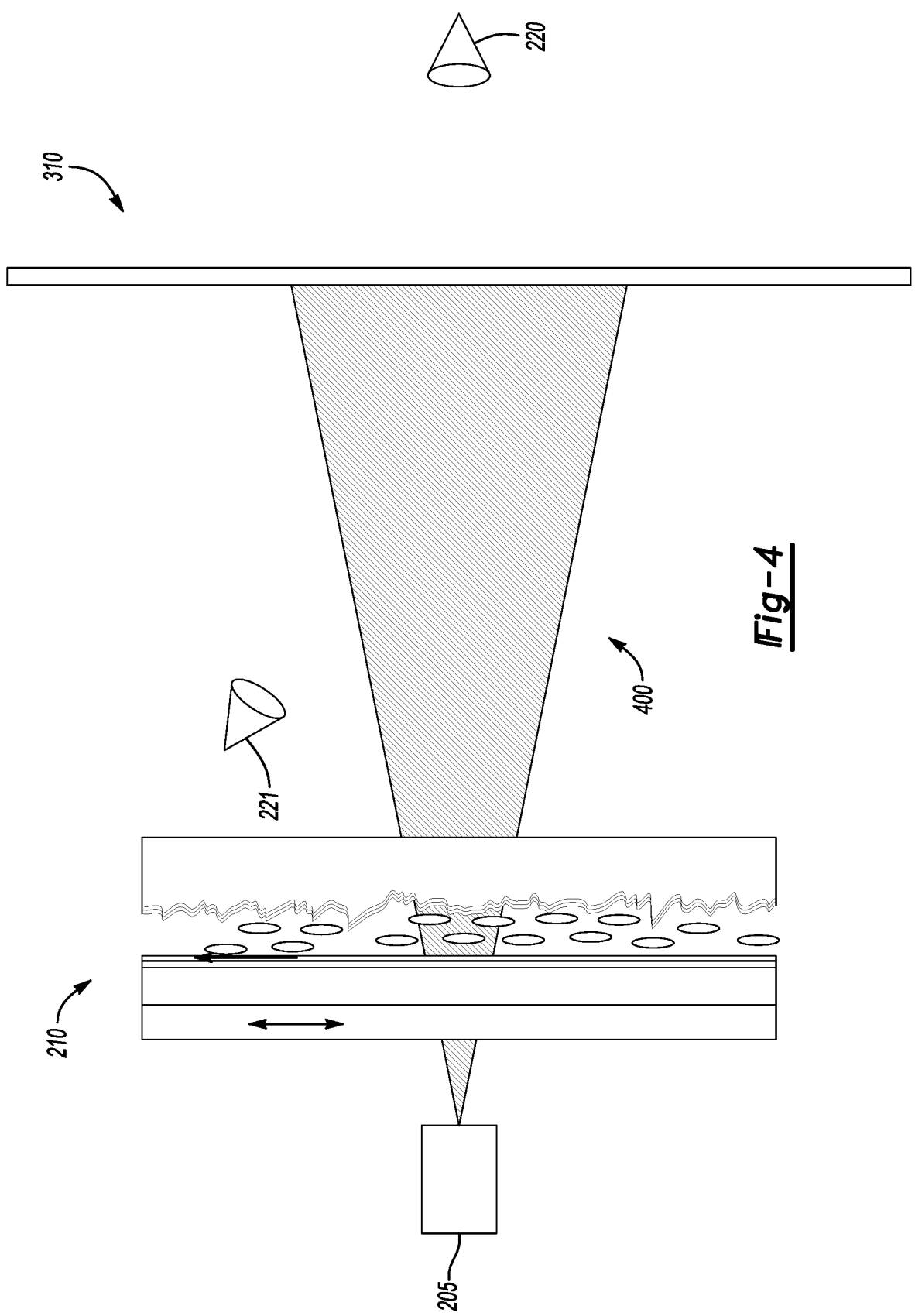

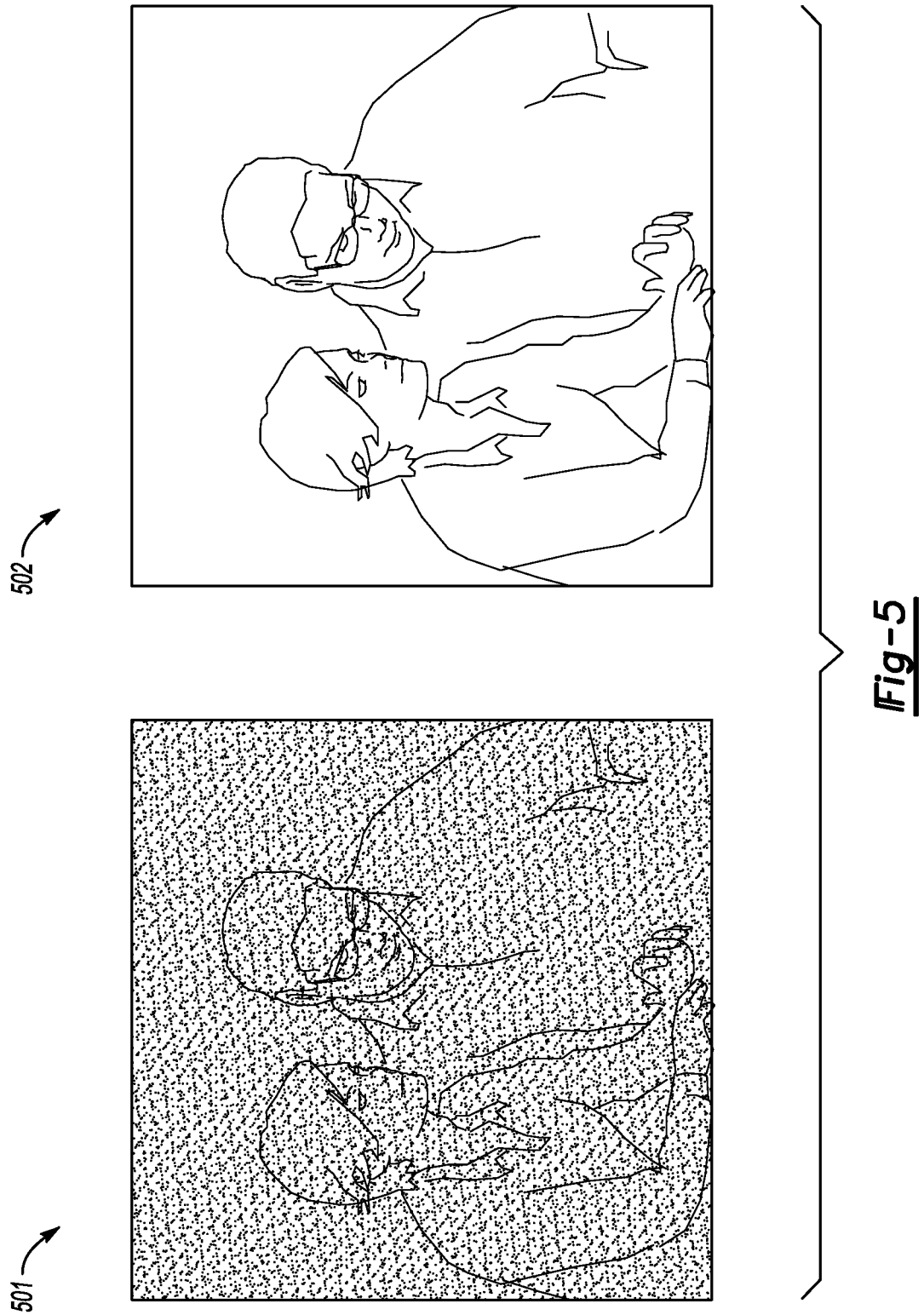

TUNABLE FILM APPARATUS

INTRODUCTION

Apparatuses and methods consistent with exemplary embodiments relate to displaying images. More particularly, apparatuses and methods consistent with exemplary embodiments relate to devices used to improve image quality of displayed images.

SUMMARY

One or more exemplary embodiments provide an apparatus that reduces speckle. More particularly, one or more exemplary embodiments provide an apparatus that including a tunable light control film configured to reduce speckle in a displayed image.

According to an aspect of an exemplary embodiment, a tunable film apparatus is provided. The apparatus includes a first and second layer, a linear polarizer disposed in front of the first layer, liquid crystal elements disposed between the first and second layer, and a tuner configured to cause temporal averaging of a light received through the linear polarizer.

The first layer and second layer may include glass or plastic substrates.

The frequency of an electric field applied to cause temporal averaging may be greater than a refresh rate of a display configured to receive light transmitted through the liquid crystal elements.

The liquid crystal elements may be an anisotropic polymer dispersed liquid crystal (PDLC) or a polymer stabilized liquid crystal (PSLC) film.

The tuner may be a polarization rotator configured to generate the electric field.

The polarization rotator may be disposed between the first layer and the linear polarizer.

The polarization rotator may be at least one from among a ferroelectric liquid crystal, a flexoelectric cholesteric liquid crystal, or a nematic liquid crystal.

The polarization rotator may cause a shift in the diffusing angle of light received through the linear polarizer when the polarization rotator is active.

The second layer may be a ground glass diffuser. The ground glass diffuser may include a rough side facing the liquid crystal elements and a smooth side opposite the rough side.

The turner may include transparent electrodes disposed between the first and second layer and planar alignment layers disposed between the transparent electrodes, and the liquid crystal elements may be disposed between the planar alignment layers.

The tuner may be configured to apply the electric field to the transparent electrodes. The tuner may include a generator configured to apply the electric field to the transparent electrodes. The electric field applied by the generator causes the light diffusing angle of light passing through liquid crystal elements to vary.

Other objects, advantages and novel features of the exemplary embodiments will become more apparent from the following detailed description of exemplary embodiments and the accompanying drawings.

BRIEF DESCRIPTION OF THE DRAWINGS

FIGS. 1A and 1B show illustrations of tunable film apparatuses according to several exemplary embodiments;

FIG. 4 shows an illustration of a tunable film apparatus placed between a screen a laser projector according to an aspect of an exemplary embodiment; and FIG. 5 shows examples of a speckled image and an ideal image without speckle.

DETAILED DESCRIPTION

Figure 2:
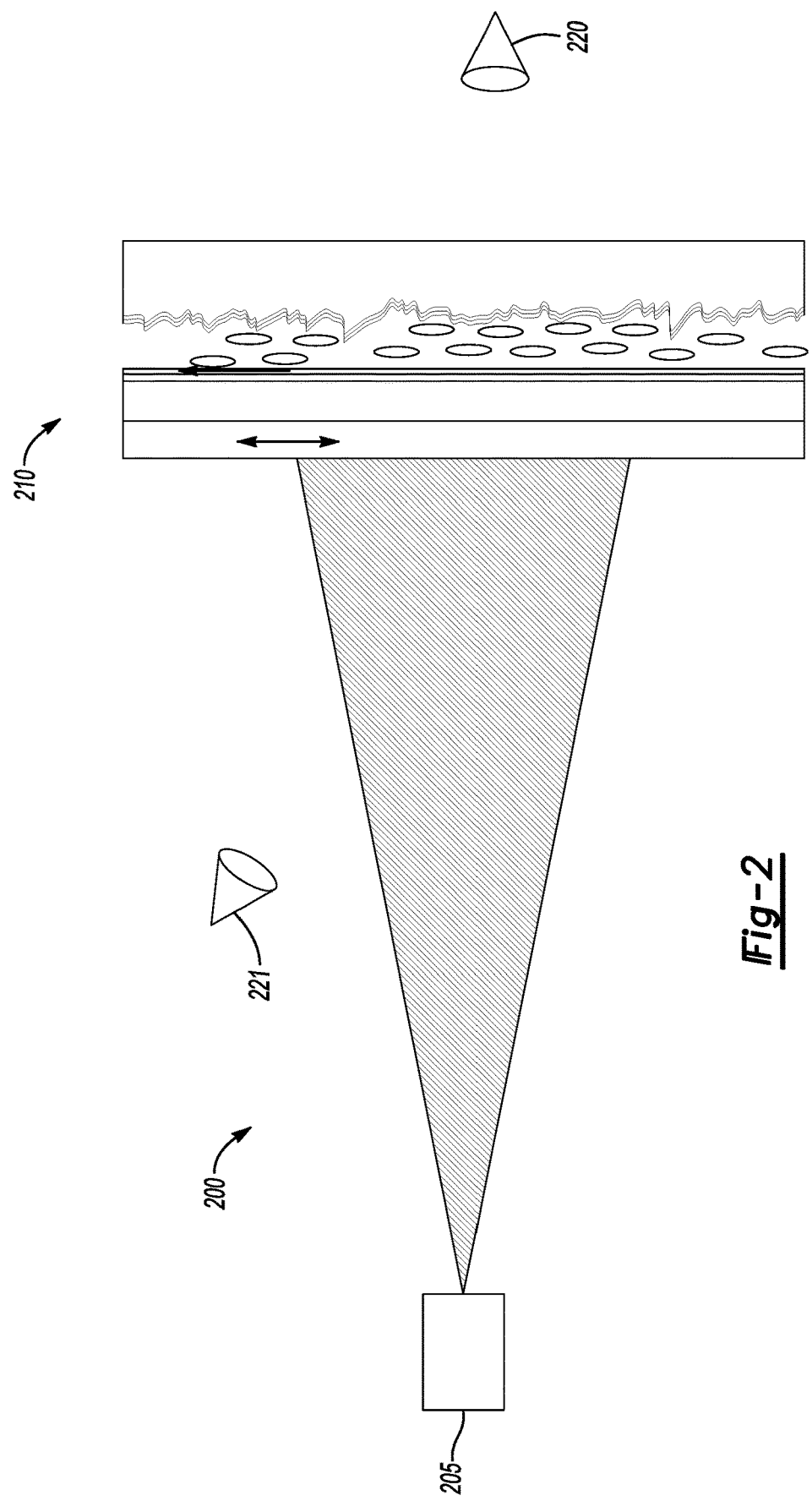
FIG. 2 shows an illustration of a tunable film apparatus used as a screen according to an aspect of an exemplary embodiment.

A tunable film apparatus will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "send" or "receive" information from a second element, the first element may send or receive the information directly from the second element, send or receive the information via a bus, receive the information via a network, or send or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Laser source displays provide the benefits of having a wide color gamut and high efficiency, but projection displays using lasers as a light source suffer from image quality issues in the form of speckles appearing on the image. Speckle arises when the laser is scattered by an atmospheric disturbance or rough surface and viewed or detected by a device with a finite aperture, e.g., an observer. In a laser projection display, the presence of speckle tends to mask the image information and therefore the reduction of speckle is highly desirable One solution to the speckled image issue is to utilize mechanical vibration or rotation for temporal averaging of the laser or light through diversification of the light angle, polarization, and wavelength. However, the mechanical vibration or rotation requires an additional motorized device, which increase the probability of mechanical failure and the packaging size. The tunable film apparatus introduces a device that generates temporal averaging effect without mechanically induced temporal averaging. The tunable film apparatus may use a mechanism that is configured to change, adjust or vary light diffusing angle via polarization control and effective refractive index control.

FIGS. 1A and 1B show illustrations of tunable film apparatuses according to several exemplary embodiments.

Referring to FIGS. 1A and 1B a first tunable film apparatus 110 and a second tunable film apparatus 120 are shown. However, the first tunable film apparatus is not limited to examples shown in FIG. 1 and may be configured differently.

The first tunable film apparatus 110 may include a first layer 111, a second layer 112, liquid crystal elements 114, a linear polarizer 116, transparent electrodes 117, and planar alignment layers 118. The first layer 111 may be a glass layer and the second layer 112 may be a ground glass diffuser layer with a refractive index value of 1.5±0.05 and a rough side facing the liquid crystal elements 114. The ground glass diffuser layer may have a rough front surface with microstructure size ranging from 1 µm to 1 mm and a rear polished surface. The ground glass diffuser may be made of borosilicate, soda lime, or synthetic fused silica. The linear polarizer 116 may be a dichroic or a wire-grid linear polarizer.

The first tunable film apparatus 110 may also include a first type of tuner 115 and be configured to receive light or a laser through the linear polarizer 116. As shown in FIG. 1A, the orientation of liquid crystal molecules in liquid crystal elements 114 may be controlled by an external electric field generated by a first type of tuner 115. The effective refractive index of liquid crystal at the interface with the microstructure changes with based on the external electric field. Therefore, the diffusing angle of the first tunable apparatus 110 is electrically-tunable. In one example, when the electrical field is deactivated or in an off state, the effective refractive index is larger than 1.5 and when the electrical field is active or is an on state, the effective refractive index is close to 1.5.

The transparent electrodes 117 may have a thickness of 50 nm. The transparent electrode may be made of silver nanowires or indium tin oxide.

The planar alignment layer 118 may have a thickness of less than 100 nm. The planar alignment layer 118 may be made of a rubbed polyimide or photoalignment layer.

The first type of tuner 115 may be a waveform generator configured to output a waveform to the transparent electrodes 117. The frequency of the waveform may be greater than a refresh rate of a display configured to display an image or receive light or laser transmitted through the tunable liquid crystal film. By applying time-varying electric field, the first type of tuner 115 may cause the anisotropic material to exhibit a time-varying refractive index match-mismatch with the microstructure of the grounded glass diffuser as shown in the third tunable film apparatus 130.

Referring to FIG. 1B, the second tunable film apparatus 120 may include a first layer 111, a second layer 112, liquid crystal elements 114, polymer 113, and a linear polarizer 116. The liquid crystal elements 114 and polymer 113 are disposed between the first and second substrates 111 and 112. The liquid crystal elements 114 may be suspended in the polymer layer 113 and may form a polymer matrix. The liquid crystal elements 114 in the polymer matrix may be an anisotropic polymer dispersed liquid crystal (PDLC) or polymer stabilized liquid crystal (PSLC) film.

The linear polarizer 116 may be a dichroic or a wire-grid linear and may be disposed in front of the first layer 111. The second tunable film apparatus 120 may also include a second type of tuner 125 in the form of a polarization rotator. The second type of tuner 125 may disposed between the linear polarizer 116 and the first layer 111. The second tunable film apparatus 120 may be configured to receive light or a laser through the linear polarizer 116.

The polarization rotator may be one from among ferroelectric liquid crystal, flexoelectric cholesteric liquid crystal, or a nematic liquid crystal. The polarization rotator may introduce temporal averaging when an alternating electric field is applied on the polarization rotator to provide the temporal averaging de-coherence, thereby controlling the polarization of incident light onto the polymer dispersed liquid crystal elements 114. The waveform is driven on the polarization rotator to be higher than the refresh rate.

FIG. 2 shows an illustration of a tunable film apparatus used as a screen according to an aspect of an exemplary embodiment. Referring to FIG. 2, a first diagram 200 showing a tunable film apparatus 210 is embedded in or part of a display used to display images generated by laser projector 205. The tunable film apparatus 210 may be one of a first tunable film apparatus 110 or a second tunable film apparatus 120. The side of the tunable film apparatus 210 with the polarizer and glass surface may face the laser projector 205. The tunable film apparatus 210 is configured to temporally average the laser projected by generated by laser projector 205 thereby varying a light diffusing angle. The display may reflect the projection of the laser projector 205 to by viewable by viewer 221 or transmit the projection of the laser projector 205 to by viewable by viewer 220.

Figure 3:
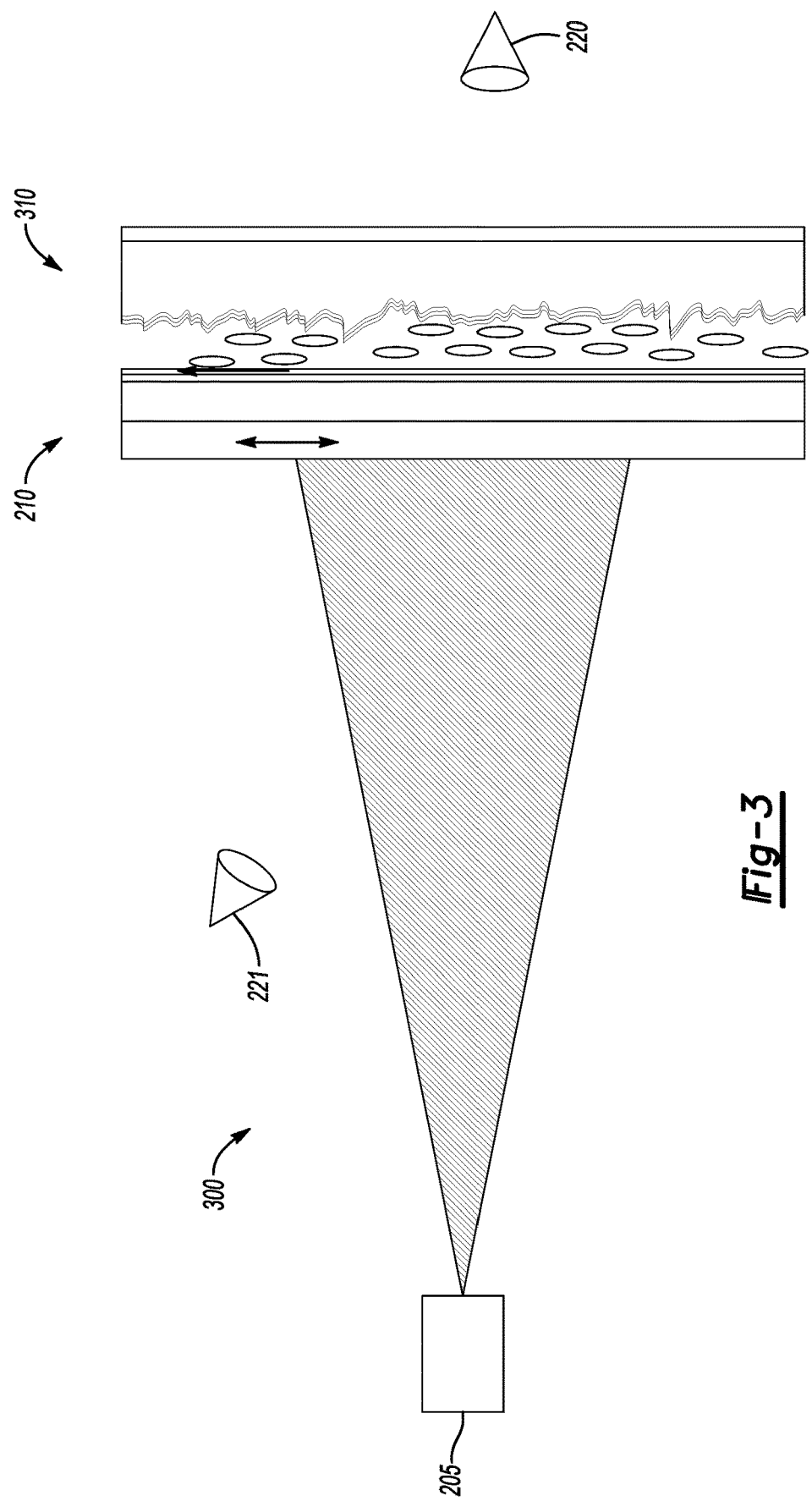
FIG. 3 shows an illustration of a tunable film apparatus placed in front of a screen according to an aspect of an exemplary embodiment.

FIG. 3 shows an illustration of a tunable film apparatus placed in front of a screen according to an aspect of an exemplary embodiment.

Referring to FIG. 3, a second diagram 300 showing a tunable film apparatus 210 is disposed adjacent to a display or screen 310 used to display images generated by laser projector 205. The side of the tunable film apparatus 210 with the polarizer and glass surface may face the laser projector 205. The tunable film apparatus 210 is configured to temporally average the laser projected by generated by laser projector 205 thereby varying light diffusing angle. The display 310 may reflect the projection of the laser projector 205 to by viewable by viewer 221 or transmit the projection of the laser projector 205 to by viewable by viewer 220.

FIG. 4 shows an illustration of a tunable film apparatus placed between a screen a laser projector according to an aspect of an exemplary embodiment.

Referring to FIG. 4, a third diagram 400 showing a tunable film apparatus 210 is disposed between a display or screen 310 used to display images generated by laser projector 205 and the laser projector 205. The side of the tunable film apparatus 210 with the polarizer and glass surface may face the laser projector 205. The tunable film apparatus 210 is configured to temporally average the laser projected by generated by laser projector 205 thereby varying a light diffusing angle. The display 310 may reflect the projection of the laser projector 205 to by viewable by viewer 221 or transmit the projection of the laser projector 205 to by viewable by viewer 220.

FIG. 5 shows examples of a speckled image and an ideal image without speckle.

Referring to FIG. 5, a first image 501 shows the result of speckle caused when a light or laser is scattered by an atmospheric disturbance or rough surface. As shown in 501 black dots appear on the image causing poor image quality. In contrast to image 501, image 502 shows an ideal image with clean crisp shades and no speckle or black dots.

One or more exemplary embodiments have been described above with reference to the drawings. The exemplary embodiments described above should be considered in a descriptive sense only and not for purposes of limitation.

Moreover, the exemplary embodiments may be modified without departing from the spirit and scope of the inventive concept, which is defined by the following claims.

What is claimed is:

1. A tunable film apparatus, the apparatus comprising:
a first and second layer;
a linear polarizer disposed in front of the first layer;
liquid crystal elements disposed between the first and second layer; and
a tuner configured to cause temporal averaging of a light received through the linear polarizer wherein the tuner includes a polarization rotator configured to generate an electric field to cause the temporal averaging including a shift in a diffusing angle of the light received through the linear polarizer when the polarization rotator is active.

2. The apparatus of claim 1, wherein the first layer and second layer comprise glass or plastic substrates.

3. The apparatus of claim 2, wherein the frequency of the electric field applied to cause temporal averaging is greater than a refresh rate of a display configured to receive light transmitted through the liquid crystal elements.

4. The apparatus of claim 3, wherein the liquid crystal elements comprise an anisotropic polymer dispersed liquid crystal (PDLC) or a polymer stabilized liquid crystal (PSLC) film.

5. The apparatus of claim 1, wherein the polarization rotator is disposed between the first layer and the linear polarizer.

6. The apparatus of claim 5, wherein the polarization rotator comprises at least one from among a ferroelectric liquid crystal, a flexoelectric cholesteric liquid crystal, or a pneumatic liquid crystal.

* * * * *